2,822,246

METHOD FOR MAKING TITANIUM NITRIDE FROM PHOSPHATES

Leif Aagaard, Plainfield, and Helmut Espenschied, Metuchen, N. J., assignors to National Lead Company, New York, N. Y., a corporation of New Jersey No Drawing. Application September 23, 1953
Serial No. 381,960

5 Claims. (Cl. 23—191)

The present invention relates in general to refractory metal compounds and more particularly to titanium compounds of nitrogen and to an improved method for making the same.

Heretofore refractory metal compounds of carbon, zirconium and the like, sometimes referred to hereinafter as metalloids, have been prepared with a modicum of success by heating dry mixtures of a refractory metal oxide, such as for example calcined titanium dioxide or zirconium oxide and carbon to form the refractory metal carbide. However, prior methods have had to contend with the problem of obtaining intimate and permanent contact between the inherently coarse metal oxide particles, and the carbon particles which, due to their fineness, tend to separate out from the mixture during reaction. In attempting to overcome this difficulty, prior technicians have resorted to pelletizing the mixtures and then heating the pellets at temperatures from 2000° C. to 2500° C. The resulting product is a hard sintered mass of material which must be subsequently broken up into smaller particles and ground. However, such products can be ground mechanically to form a finely divided powder only with great difficulty due to the abrasiveness and hardness of the compositions. Hence, even the ground material is relatively coarse, the smallest particle size being about 80 microns. Moreover, the purity and toughness of this product is often impaired by a high percentage of graphite which forms when excess carbon is dissolved in titanium carbide; or by partial dissociation of the carbide at temperatures above 2000°. Although these relatively coarse products have been used in the field of powder metallurgy, the impurity and coarse granular nature of the material has impaired its usefulness. There is, therefore, no direct and commercially practicable method for producing finely divided relatively pure refractory metal compounds of nitrogen, without recourse to grinding and milling operations.

An object, therefore, of the present invention is to provide an improved method for making a refractory metal compound of nitrogen which is economical, which may be carried out at relatively low temperatures and which is productive directly of a relatively pure finely divided product.

A further object of the invention is to provide a superior method for forming a mixture of carbon, a refractory metal and nitrogen wherein the carbon particles are maintained in intimate contact with the refractory metal.

A still further object of the invention is to provide substantially pure finely divided particles of titanium nitride.

These and other objects will become apparent from the following more complete description of the instant invention.

The term "finely divided" as used herein with reference to the size of the titanium nitride particles formed directly by the process of this invention shall be understood to mean that the effective sizes of the particles may vary from 1 to 50 microns.

In its broadest aspects, the present invention relates to a new and improved titanium nitride composition; and to an improved method for making said compound which comprises forming an intimate mixture of a titanium phosphate and carbon, and then heating the mixture in an atmosphere of nitrogen at a temperature of from 1100° C. and higher until the reaction is completed, generally at about 1600° C. to produce a finely divided titanium nitride.

In carrying out the invention it was discovered that the successful production of substantially pure finely divided titanium nitride is dependent, in large measure, upon achieving an intimate mixture of the carbon and titanium components. As pointed out above, due to the coarseness of calcined oxides of titanium, as compared to the particle size of lamp black, it is extremely difficult to form and maintain an intimate mixture of calcined titanium dioxide and finely divided carbon. However, the instant invention embraces the discovery that the problem of forming intimate mixtures of the titanium values and carbon can be effectively solved by providing the titanium values in the form of a titanium phosphate prepared by reacting titania hydrate with phosphoric acid.

The titania hydrate used in carrying out the process of this invention may be titania metahydrate or titania orthohydrate and is preferably an untreated hydrate which occurs as an intermediate product in the production of titanium dioxide pigment and which is generally referred to in the art as "pulp." This untreated titania hydrate, or pulp, comprises particles, i. e. crystalloids or groups of crystalloids, the effective sizes of which may vary from 0.05 to 0.2 micron. Since the untreated pulp is usually formed by hydrolyzing an acid solution of titaniferous ore, the untreated pulp will contain or be combined with about 10% sulfuric, or hydrochloric acid, depending on the kind of acid solution used, and although the presence of the acid in the hydrate is not known to have a deleterious effect on the process or product of the invention, it is within the purview of the invention to remove the acid fraction from the hydrate by any of the techniques well known to the art of pigment manufacture.

In achieving the objects of this invention it was discovered that when finely divided carbon is mixed with a titanium phosphate, the particles of carbon are not only thoroughly and completely dispersed throughout the mixture but that the fine particle sizes greatly enhance the reactivity thereof such that when dried, the mixture may be calcined at relatively low temperatures in an atmosphere of nitrogen to produce a substantially pure finely divided titanium nitride.

With respect to the carbon used in the mixture of materials, a finely divided carbon, such as lamp black or oil burner soot, is suitable, the unit particles of which have an effective size of from about 0.01 to 0.05 micron. It is also within the purview of the invention to use a hydrophilic carbon, that is to say a carbon which has been treated with a suitable wetting agent, as for example one of the polyethylene glycol type, to insure dispersion of the carbon particles in an aqueous medium; or a wetting agent may be added to the admixed titanium phosphate and carbon.

In carrying out the process of this invention for the preparation of titanium carbide, the carbon may be admixed with the titanium phosphate in either of two ways. One way is to form the titanium phosphate first by mixing an aqueous slurry of titania hydrate with phosphoric acid in substantially stoichiometric amounts, partially drying the mixture and then heating the dried mixture to form the pyrophosphate having the formula $TiP_2O_7$.

The pyrophosphate is recovered in the form of a dry fine powder to which is added the stoichiometric amount of dry carbon. After thoroughly mixing the dry powders in a mortar or other suitable means, the mixture is transferred directly to calcining means, such as for example an induction furnace or a rotating kiln capable of maintaining the temperatures required for calcining the powdered material. The material is calcined at temperatures of from about 1100° C. to as high as about 1600° C. for from about 2 to 4 hours in an atmosphere of nitrogen.

The reaction between the titanium pyrophosphate and carbon during calcination in the presence of nitrogen may be represented by the following equation:

$$2TiP_2O_7 + 14C + N_2 \rightarrow 2TiN + 4P + 14CO$$

wherein 2 mols of titanium dioxide added in the form of titanium pyrophosphate react with 14 mols of carbon and 1 mol of nitrogen to form 2 mols of titanium nitride, 4 mols of phosphorus and 14 mols of carbon monoxide.

The final product is a golden yellow metallic powder having substantially no free carbon, the percentage of titanium present being from 78% to 80% and the percentage of nitrogen present being from 18% to 20% which compares favorably with the theoretical composition of pure titanium nitride. The size of the titanium nitride particles formed directly by calcination of the pyrophosphate and carbon in an atmosphere of nitrogen, that is to say without subsequent grinding, varies from 1 to 15 microns and may be smaller if somewhat higher calcining temperatures are used.

As an alternative method of mixing the carbon and titanium values, a predetermined amount of carbon, preferably a hydrophilic carbon which is miscible in an aqueous medium, is added to a mixture of phosphoric acid and aqueous titania hydrate slurry and the ingredients thoroughly mixed by agitation after which the mixture may be partially dried by heating at relatively low temperatures, as for example from 150 to 250° C. The dry or partially dried mixture is then broken up to provide a fine powder which is calcined in the manner hereinabove described to form titanium nitride.

To further illustrate the invention, the following example is given:

*Example I*

To 10 parts by weight of titanium pyrophosphate prepared from an admixture of titania hydrate and phosphoric acid were added 4 parts by weight of carbon in the form of a carbon black powder. The mixture was worked for a sufficient length of time to insure an intimate mixture of the pyrophosphate and carbon particles whereupon the mixture was introduced into a resistance furnace and calcined at a temperature of about 1500° C. for two hours in an atmosphere of nitrogen.

The resulting product comprised a finely divided titanium nitride powder, the effective size of the unit particles being from 1 to 5 microns. An analysis of the product showed about 79% titanium and 21% nitrogen.

In accordance with the improved process of this invention, metalloids of refractory metals, and in particular titanium nitride, may be produced in an efficient and economical manner and from relatively inexpensive source materials. Moreover, the temperatures employed are relatively low, thereby precluding sintering and the formation of relatively large size agglomerates, the calcining temperature for titanium nitride being from about 1100° C. to about 1500° C. Further, the finely divided product of this invention has an effective particle size ranging from 1 to 50 microns but mostly of from 1 to 15 microns; and are quite free of free carbon, occluded graphite or other foreign materials. This highly superior titanium nitride is thus ideally suited for use in powder metallurgy, as abrasives, and in the production of cutting tool alloys and high temperature resistant alloys suitable for use in the manufacture of gas turbine blades.

While this invention has been described and illustrated by the examples shown, it is not intended to be strictly limited thereto, and other variations and modifications may be employed within the scope of the following claims.

We claim:

1. Method for the production of titanium nitride which comprises forming an intimate and at least stoichiometric mixture of titanium pyrophosphate and carbon and heating said mixture in an atmosphere of nitrogen at a temperature of from about 1100° C. to about 1600° C. to calcine said mixture and produce titanium nitride having a particle size in the range of from 1 to 50 microns.

2. Method for the production of titanium nitride which comprises admixing an aqueous titania hydrate slurry with phosphoric acid and lamp black; agitating the ingredients to form an intimate and at least stoichiometric mixture of said hydrate, phosphoric acid and lamp black; and then heating said mixture in an atmosphere of nitrogen to a temperature from 1100° C. to 1600° C. to calcine said mixture and produce titanium nitride having a particle size in the range of from 1 to 50 microns.

3. Method for the production of titanium nitride which comprises: admixing an aqueous titania hydrate slurry with phosphoric acid and heating the mixture to form titanium pyrophosphate; admixing at least a stoichiometric amount of finely divided carbon with said titanium pyrophosphate; and then heating said mixture in an atmosphere of nitrogen to a temperature from 1100° C. to 1600° C. to calcine said mixture and produce titanium nitride having a particle size in the range of from 1 to 50 microns.

4. Method for the production of a titanium nitride which comprises: mixing an aqueous substantially acid-free titania hydrate slurry with phosphoric acid and a hydrophilic carbon, agitating said ingredients to form an intimate and at least stoichiometric admixture of said hydrate, phosphoric acid and carbon, partially drying said admixture, and then heating the partially dried mixture to a temperature of from 1100° C. to 1600° C. in an atmosphere of nitrogen to calcine said mixture and produce titanium nitride having a particle size in the range of from 1 to 50 microns.

5. Method for the production of a titanium nitride which comprises: mixing an aqueous substantially acid-free titania hydrate slurry with phosphoric acid, carbon and a wetting agent, agitating said ingredients to form an intimate and at least stoichiometric admixture of said hydrate, phosphoric acid and carbon, partially drying said admixture, and then heating the partially dried mixture to a temperature of from 1100° C. to 1600° C. in an atmosphere of nitrogen to calcine said mixture and produce titanium nitride having a particle size in the range of from 1 to 50 microns.

References Cited in the file of this patent

UNITED STATES PATENTS

| 957,842 | Bosch | May 10, 1910 |
| 1,027,312 | Bosch et al. | May 21, 1912 |
| 1,159,989 | Peniakoff | Nov. 9, 1915 |

FOREIGN PATENTS

| 522,487 | Belgium | Dec. 16, 1953 |
| 23,840 | Great Britain | Nov. 22, 1902 |
| 277,715 | Great Britain | Dec. 20, 1928 |

OTHER REFERENCES

J. W. Mellor's "A Comprehensive Treatise on Inorganic and Theoretical Chem.," vol. 8, pages 117–119. Longmans, Green and Co., N. Y.